(12) United States Patent
Reichelt (10) Patent No.: US 6,427,072 B1
(45) Date of Patent: Jul. 30, 2002

(54) RESERVE POWER SYSTEM FOR ANY BATTERY OPERATED DEVICE

(75) Inventor: Martin Reichelt, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/223,211

(22) Filed: Dec. 30, 1998

(51) Int. Cl.[7] ............................................. H04M 11/00
(52) U.S. Cl. ........................ 455/404; 455/572; 455/574
(58) Field of Search ................................ 455/404, 564, 455/565, 574, 572, 575, 38.3, 343; 340/636

(56) References Cited

U.S. PATENT DOCUMENTS

| | | | |
|---|---|---|---|
| 4,755,816 A | | 7/1988 | DeLuca ................. 340/825.44 |
| 5,095,308 A | * | 3/1992 | Hewitt ......................... 455/343 |
| 5,170,491 A | * | 12/1992 | Murata ........................ 455/572 |
| 5,222,248 A | * | 6/1993 | McDonald et al. ......... 455/436 |
| 5,684,404 A | * | 11/1997 | Milla ........................... 340/636 |
| 5,726,636 A | * | 3/1998 | Hayes, Jr. .................... 340/636 |
| 5,742,666 A | * | 4/1998 | Alpert ......................... 455/404 |
| 5,783,327 A | * | 7/1998 | Mendiola ..................... 429/97 |
| 5,797,101 A | * | 8/1998 | Osmani et al. .............. 455/551 |
| 5,870,685 A | * | 2/1999 | Flynn ........................... 455/573 |
| 5,890,061 A | * | 3/1999 | Timm et al. ................. 455/404 |
| 6,006,116 A | * | 12/1999 | Vermeer ...................... 455/572 |
| 6,058,320 A | * | 5/2000 | Yokota ......................... 455/574 |
| 6,115,598 A | * | 9/2000 | Yu .............................. 455/404 |
| 6,230,032 B1 | * | 5/2001 | Liljegren ..................... 455/572 |

FOREIGN PATENT DOCUMENTS

| | | |
|---|---|---|
| EP | 0 674 377 | 9/1995 |
| EP | 0 287 305 | 10/1998 |
| GB | 2 335 569 | 9/1999 |
| JP | 09277652 | 10/1997 |
| JP | 10225002 | 8/1998 |
| JP | 11027873 | 1/1999 |

OTHER PUBLICATIONS

ETSI, GSM Technical Specification: Digital Cellular Telecommunications System; Unstructured Supplementary Service Data (USSD) Stage 2, GSM 03.90, Dec. 1996, Version 5.0.0.

* cited by examiner

Primary Examiner—Nay Maung (57) ABSTRACT

A mobile telephone with an emergency call capability protector monitors a battery power supply circuit with an emergency call reserve power detector to determine when the power remaining in the battery power supply circuit has decreased beneath a pre-selected minimum emergency call reserve power level that is greater than the absolute minimum level detected by a monitor and battery depletion detector. A microprocessor operating in accordance with a program stored in an emergency call capability program memory selectively inhibits, subject to override, the making of non-emergency calls and terminates ongoing non-emergency calls when said power detector determines that the power supply circuit has gone beneath said pre-selected minimum emergency call reserve power level.

16 Claims, 8 Drawing Sheets

RESERVE POWER SYSTEM FOR ANY BATTERY OPERATED DEVICE

BACKGROUND OF THE INVENTION

This invention relates generally to battery powered devices and, more specifically, to hand held portable mobile telephones with limited battery power supplies that become depleted during operation of the mobile telephone.

Portable battery powered devices such as personal mobile telephones that are manually carried by a person, as opposed to a so-called car telephone, are operated on a rechargeable battery power supply that becomes depleted during mobile use when not connected to an external source of power such as an AC/DC converter. It is known in battery powered devices such mobile telephones to provide a battery monitor circuit to monitor the level of remaining battery power available for telephone call making operations of the mobile telephone. A general display of the battery power remaining is made available upon actuation of an appropriate function key. When the battery power supply level has fallen beneath an absolute minimum limit, or depletion level needed to make or continue an ongoing call, then a special indication or warning is given of this low power disabled condition. Once this disabled condition is reached it is impossible to use the mobile telephone to make any calls whatsoever, including emergency calls.

It is widely recognized that a very important reason that mobile telephones are widely used is because of the added security they provide. The mobile telephones enable the user to make emergency calls for police, paramedic and fire fighting services and to make calls to private emergency numbers to parents, spouses and other family relations and to other numbers which one needs to call in the case of emergency.

In the course of creation of the invention, it has been considered that because people will often not monitor the level of the battery power supply and will also not carry a charged replacement battery, known mobile telephones have a serious shortcoming. It is possible for a mobile telephone user to find themselves in an emergency, including a life or death emergency, in which their mobile telephone is disabled because of operation of the telephone for non-emergency calls that depleted the battery power supply beneath the minimum absolute limit required to make any calls, including emergency calls. It is possible for a child or teenager provided with use of a mobile telephone solely for purposes of enabling them to call or receive calls from home or to place calls to other special emergency numbers, to deplete the battery during operation of the mobile telephone during non-emergency calls despite instructions to the contrary.

What is desired, therefore, is a way to allocate a predetermined reserve power level in a battery operated device.for emergency or pre-selected activity use. It is further desired to enable a more accurate battery level determination and use of said information for predetermined systems or apparatus activities.

Accordingly, it is an object of the present invention to provide an improved system, method and apparatus for monitoring power levels in a battery operated device.

It is also an object of the present invention to utilize the improved battery monitoring levels to allocate certain varying battery power to predetermined uses.

It is also an object of the present invention to allow for a user of a device to allocate the battery power for specific functions of the device that the user has chosen.

SUMMARY OF THE INVENTION

In accordance with the present invention the disadvantages of known battery powered devices such as mobile telephones and similar battery dependent devices are overcome by providing a reserve power allocation system, such as a mobile telephone and method of operation with an emergency call capability protector which inhibits the making of non-emergency calls under certain preconditions and also allows for user function selection based up battery level and usage criteria.

In accordance with the invention, one embodiment of the present invention is a mobile telephone having a battery power supply with a total power level that declines during operation, a means for performing a send call function, a means for actuating the send call function, a means to selectively make, both emergency mobile calls and non-emergency mobile calls while enabled by the power level being above an absolute minimum limit, a means for detecting when the power level decreases beneath an emergency call reserve level that is greater than the absolute minimum level, and a means responsive to the detecting means for inhibiting the send call function from making non-emergency calls when the power level decreases beneath the emergency call reserve level.

In accordance with the invention, one embodiment of the present invention is a mobile telephone having a battery power supply with a total power level that declines during operation, a means for detecting when the power level decreases beneath an emergency call reserve level that is greater than the absolute minimum level, and a means responsive to the detecting means for indicating the low power situation to the user when the power level decreases beneath the emergency call reserve level.

Accordingly, the invention also provides a method for protecting emergency call capability in a mobile telephone having a battery power supply with a total power level that declines during operation, means for performing a send call function, and means for actuating the send call function to selectively make both emergency mobile calls and non-emergency mobile calls while enabled by the power level being above an absolute minimum limit by performing the steps of detecting when the power level decreases beneath an emergency call reserve level that is greater than the absolute minimum level, and responding to the detecting means to inhibit the send call function from making non-emergency calls when the power level decreases beneath the emergency call reserve level.

Also, provided is a method for protecting emergency call capability in a mobile telephone having means for actuating a send call function to make both non-emergency and emergency calls, comprising the steps of distinguishing between an actuation of the send call function to make a non-emergency call and an actuation of the send function to make an emergency call, detecting at least one precondition for inhibiting non-emergency calls, and responding to the detecting means to inhibit the send call function from making a non-emergency call if the at least one precondition has been detected.

BRIEF DESCRIPTION OF THE DRAWINGS

The disclosed inventions will be described with reference to the accompanying drawings, which show important sample embodiments of the invention and which are incorporated in the specifications hereof by reference, wherein.

DETAILED DESCRIPTION

Figure 1:
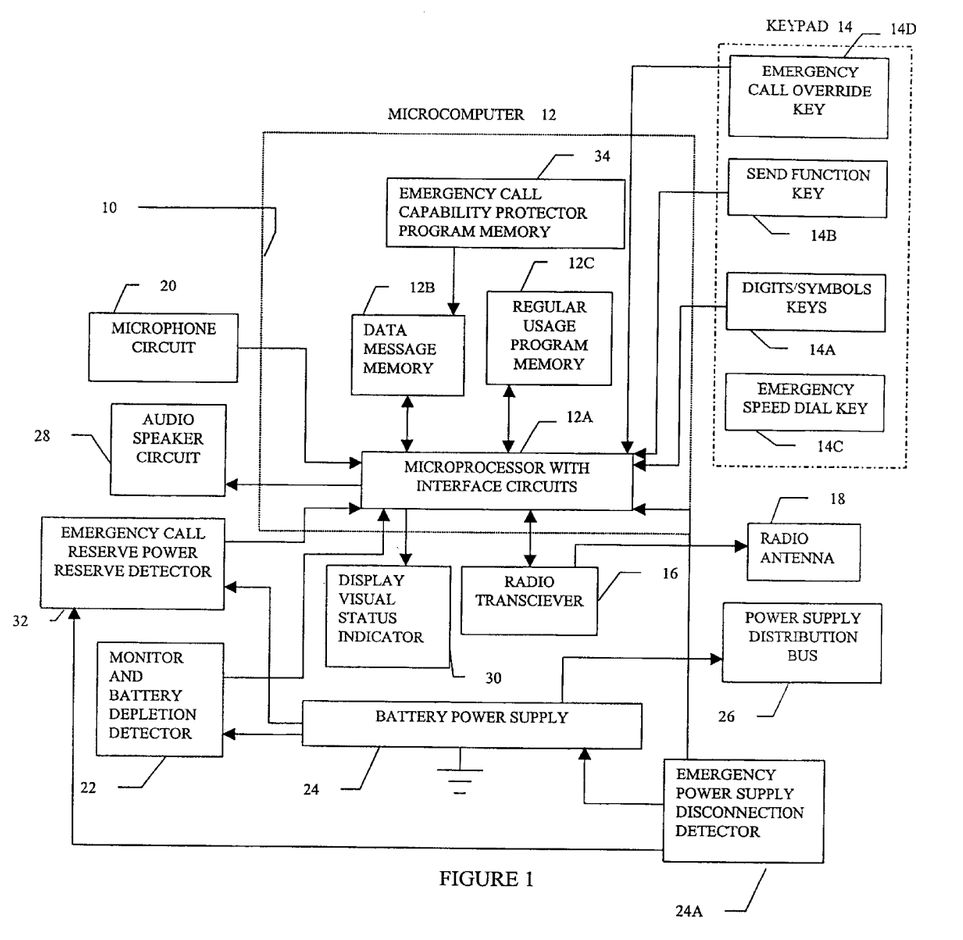
FIG. 1 is a functional block diagram of the preferred embodiment of the emergency call capability protecting mobile telephone of the present invention.

Referring now to FIG. 1, a battery powered device is exemplified in the preferred embodiment of the emergency call capability protecting mobile telephone of the invention and is seen to include some conventional elements found in known mobile phones. These conventional elements include a microcomputer 12 that controls the other elements of the mobile telephone 10 to perform all of its operations in response to inputs from a keypad 14, a radio transceiver 16 which transmits and receives signals through air via an antenna 18, a microphone circuit 20 and a monitor and battery depletion detector 22.

The monitor and battery depletion detector 22 has at least one input connected to a battery power supply circuit 24. The battery power supply circuit 24 includes a rechargeable, releasably attached battery pack (not shown) including at least one battery cell. Preferably, the monitor and battery depletion detector, or depletion detector 22 monitors the power level of the battery power supply circuit 24. It provides a signal to the microcomputer 12 when the power remaining decreases beneath a pre-selected absolute minimum limit necessary to make, receive or maintain any type of mobile calls. In such event, the microcomputer 12 provides a low power supply indication signal to the display-visual status indicators 30, which responds by disabling the radio transmitter 16 and other nonessential components from drawing further power from the battery power supply. This is done to prevent excessive depletion and possible damage to the battery. In this power shutdown condition, no mobile calls can be made, received or continued.

The battery power supply circuit 24 produces DC power at a pre-selected DC voltage level that is distributed to all the other components via a power supply distribution bus 26. The power distribution bus 26 includes bus conductors printed on one or more circuit boards to which other components are mounted and other appropriate connectors as needed to deliver DC power to the various components. Connected directly to the battery supply circuit 24 is an external power supply disconnection detector 24A for determining when external power supply is removed thereby necessitating battery power.

The microcomputer 12 also provides output control signals to an audio speaker circuit 28, to an alphanumeric display and visual status indicators 30 and to the radio transmitter 16. It receives voice and other audio input signals from a microphone circuit 20. Further, it receives signals from an external power supply disconnection detector 24A.

The keypad 14 includes digits and symbols keys 14A, a send function key 14B and preferably an emergency speed dial key 14C. In addition, a special emergency call override key 14D is preferably provided for use only with the mobile telephone version of this invention. All of these keys are connected to inputs of the microcomputer 12.

Actuation of the digits and symbols keys 14A results in the corresponding digits and symbols being shown on display 30. When the send function key 14B is actuated the microcomputer causes the radio transceiver 16 to transmit a radio signal with messages encoded to represent the numbers and symbols shown on the display 30 at the time of the actuation of the send function. These messages are sent with other interface messages needed to establish an airwave communication link with the personal mobile communication sub-network base station within the service territory of which the mobile telephone 10 is located.

Actuation of the emergency speed dial key 14C, on the other hand, causes the microcomputer 12 to automatically transmit the appropriate messages to make an emergency call to a pre-selected, pre-stored emergency number without first requiring actuation of the send function key 14B. Actuation of the emergency call override key 14D is used to override and confirm override disablement of non-emergency call capability as explained in more detail with reference to FIG. 2.

The microcomputer 12 includes a conventional microprocessor with suitable interface circuits, or microprocessor 12A interfaced with all the other non-computer components. It is also connected with a data and message memory 12B for storing preset data, emergency and other speed dial numbers, message buffers, and a regular usage program memory 12C. These conventional components perform functions as suggested by their names and are constructed in a manner that is well known by persons of ordinary skill in the art of mobile telephone design. The microcomputer 12A controls substantially all communication and administrative mobile telephonic functions of the mobile telephone 10 by methods well known the present art.

In accordance with the invention, in addition to the conventional components noted above, the call capability protecting mobile telephone 10 includes novel elements that cooperate with the conventional elements and with each other to obtain the advantages of the invention. In addition to the emergency call override key 14D mentioned above, these novel elements include an emergency call reserve power detector 32 that detects when the remaining power level, or power level, of the battery power supply circuit 24 decreases beneath an emergency all reserve level. Connected to said emergency call reserve power detector is a external power disconnection detector 24A which indicates when external power has been removed, thereby requiring battery power. In accordance with the invention, the emergency call reserve power level is greater than the absolute minimum limit, or depletion level. When the battery power level is decreased beneath the depletion level, the mobile telephone is disabled from making, receiving or continuing any mobile telephone calls both emergency and non-emergency calls. Depletion of the battery power supply circuit 24 is detected by the monitor and battery depletion detector 22. In accordance with the invention, the function performed by the reserve power detector is achieved by different means and in different ways depending upon the different types of batteries and circuits used to perform the battery power supply circuit function 24. These different embodiments are described below with reference to FIGS. 3, 4, 5A, 5B, 5C and 6.

In general, the battery power supply circuit 24 provides input signals to the emergency call reserve power detector 32, and the emergency reserve power detector 32, in turn, provides signals to the microprocessor 12A from which the microprocessor determines whether the power has decreased beneath the emergency call reserve power level.

The emergency call capability protector of the present invention also includes an emergency call capability protector program memory 34 that contains an emergency call capability protector subroutine for controlling the microprocessor 12A to automatically inhibit the send call function from making a non-emergency call if a pre-selected precondition occurs. In keeping with an important aspect of the invention, the at least one precondition is the precondition of the power level decreasing beneath the emergency call reserve level as determined from the output signals from the reserve power detector. This protector subroutine interacts with the regular usage program memory, and preferably, both the regular usage program of memory 12C and the emergency call capability protector are stored in different sections of a single ROM. The emergency call capability protector program preferably operates in accordance with the logic flow chart of FIG. 2.

Briefly, the microprocessor 12A distinguishes between an actuation of the send call function to make a non-emergency call and an actuation to make an emergency call, and responds to detection of at least one precondition to automatically inhibit the send call function from making a non-emergency call if the at least one precondition has been detected. In the cases of the at least one condition being the power level falling beneath the emergency call reserve power level, the microprocessor 12A responds to the reserve power detector 32 to selectively inhibit the send call function from making non-emergency calls when the power level decreases beneath the emergency call reserve level.

Figure 2:
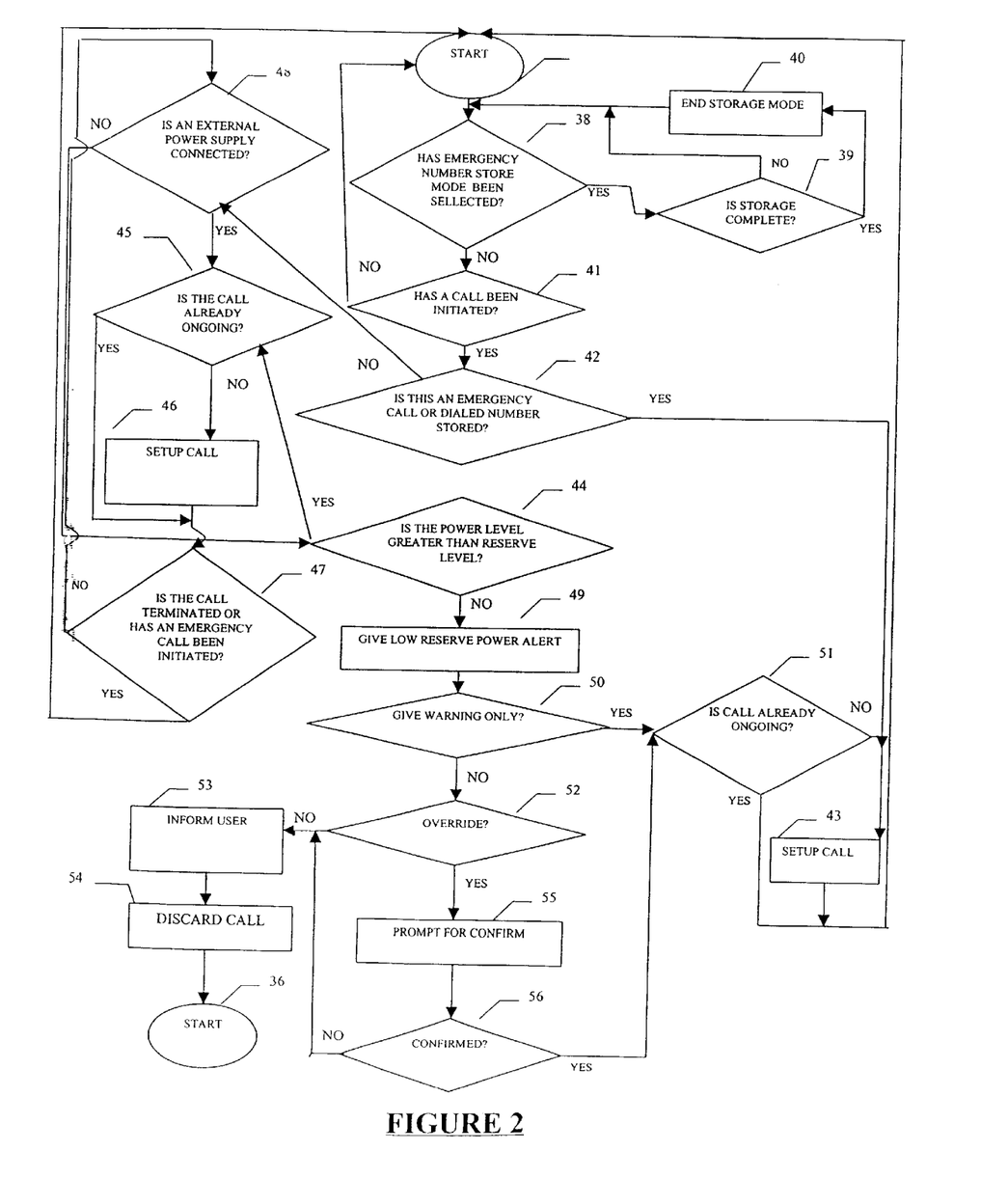
FIG. 2 is a logic flow chart of the preferred embodiment of the emergency call capability protector program of the invention that is stored in the emergency call capability protector program memory of the mobile telephone of FIG. 1.

Referring to FIG. 2, after the start 36 of the emergency call capability protector program memory 34, in step 38 a determination is made as to whether the program has entered an emergency number storage mode in which the user is enabled to selectively store at least one and preferably a plurality of emergency numbers. If the storage mode has been entered, then a determination is made in step 39 as to whether the storage of the emergency numbers is complete. If so, then the storage mode is ended in step 40, and the program returns to step 38 after the emergency number is stored in the data-message memory 12B. If not, then the program recycles until determination is made in step 38 that the emergency number storage mode is no longer selected.

If the storage mode is no longer selected or if not selected in the first instance, then the program proceeds to step 41 to determine if a call has been initiated, preferably by determining if the send function key 14B has been activated. If a call has not been initiated, then the program returns to the Start, step 36. If a call has been initiated then a determination is made in step 42 as to whether it is an emergency call or one that was stored as a permitted number to call. If it is an emergency call or a pre-assigned permitted low power call then a call is set up in step 43, whereafter the call is set a return to start 36 is made. During a call the power level is monitored to determine whether it has fallen beneath the absolute depletion level at which all calls, including emergency calls must be terminated as will be explained in further detail below. If the number dialed is not an emergency call or a pre-assigned permitted low power call, then the program proceeds to step 48, wherein a determination is made as to whether an external power supply has been attached or not. If an external power supply has been connected, then a check is made in step 45 if a call is already ongoing. If this check is made for the first time, the outcome of the check will be "No", and the call is setup in step 46. In step 47 a determination is made if the call(s) has/have been terminated or if, in addition to the ongoing calls, an emergency call has been initiated. If so, then a return to the start, step 36, is made. If not, the flow continues with step 48. If the external power supply is still connected, in step 45 it will be determined that the call is already ongoing. The flow will continue looping through the steps 47, 48, 45, 47, 48, 45 etc. continuously. If no external power supply was connected in the first place, or if a previously connected power supply is disconnected, the program will determine that in step 48 and will then continue in step 44. In this step, the program determines whether the power level is greater than the pre-determined reserve power level and by definition also the depletion level, and if it is, the aforementioned steps 45–48 are repeated. If in step 47 the call is terminated or an emergency call has been initiated the program returns to step 36.

If the power level determined in step 44 is not greater than the pre-determined reserve power level, then in step 49 a lower power reserve alert is given. If the selection had been made in step 50 that a warning only was to be given, then in step 51 a check is made to see if a call is ongoing. If the call is ongoing, in step 51 the program returns to start 36 with the user now aware of the low power situation and may maintain the call until the power level reaches the depletion level. If the selection had not been made to give a warning only, then the option is given in step 52 to override the power reserve feature. If the override option was not chosen in step 52, then in step 53 the user is reminded that the call is about to be disconnected due to the low power situation and then call is then disconnected in step 54 after the predetermined time interval. The user will have the option to determine a time interval between when the user is informed that the call will be discarded and when it actually is discarded, bearing in mind time limitations to save power. After the call has been discarded the program returns to start 36.

If the override in step 52 is selected, then in step 55 a prompt for confirmation is given. If confirmation is given in step 56, then the program proceeds to step 51 to see if a call is ongoing. If, in step 52 confirmation is not received, then the program proceeds to step 53 wherein the user is informed of the pending call discarding.

Thus, it is seen that in accordance with the method of the invention, the protector program is capable of distinguishing between emergency and non-emergency calls in two different ways. In the first way, at least one memory location is provided for storing at least one emergency telephone number. The emergency numbers are first entered into the special emergency number memory location by the user appropriately manipulating the digits and symbols keys 14A to access the special memory location and to enter the actual emergency numbers for relatively permanent storage. Afterwards, when a user enters a telephone number into temporary storage at a called number memory location and actuates the send function key 14B to make a call to the intended called number, the microprocessor 12A pursuant to the protector program of FIG. 2 compares the "dialed" or "called", number with the pre-stored emergency number to determine if there is a match. If there is a match, then the send call function is enabled to make the emergency call regardless of the power level being beneath the emergency call reserve power level so long as the power level is above the absolute limit, or depletion limit. If there is not a match, indicating that the attempted call is not an emergency call, then various non-emergency call inhibit functions are performed as described below if the precondition of the battery power level being less than the pre-selected emergency call power reserve level is detected. Otherwise, the non-emergency call is enabled.

Preferably, the mobile telephone 10 has an emergency speed dial function associated with the emergency speed dial key 14C. In accordance with the emergency speed dial function, pre-stored emergency numbers are automatically dialed and transmitted in response to actuation of the emergency speed dial key 14C, alone, without actuation of the send function key. Alternatively, the actuation of the emergency speed dial key 14C merely causes the associated emergency number to be entered into the temporary called number memory for transmission in response to actuation of the send function key 14B.

The second way in which the microprocessor 12A distinguishes an emergency call from a non-emergency call is to assume that the call being made is an emergency call solely in response to detection of actuation of the emergency speed dial key 14C. In such event, there is no need to make a comparison with other pre-stored emergency numbers that are unassociated with the pre-stored speed-dial numbers. Once the actuation of the emergency call speed dial key 14C is detected, the emergency call is automatically enabled regardless of the power being less than the emergency call reserve level conditional upon the power level remaining above the absolute depletion limit.

Still referring to FIG. 2, it is seen that in accordance with the method of the invention, a plurality of call inhibit functions are made available that are pre-selectable for use alternatively and in combination. These non-emergency inhibit functions include provision of an emergency call reserve power warning and prevention of making of the non-emergency call by disabling the send call function. Preferably, a pre-stored voice message provides an explanation of the reason for warning. If a warning only mode is pre-selected, then the send call function is not disabled to prevent the making of the non-emergency call. Instead, the warning and explanation are relied upon to simply alert the user of the potential problem associated with continuation of a non-emergency call to enable an informed judgement. Preferably, the warning also includes an audible warning produced by the audio speaker circuit under control of the emergency call capability protector. If desired and able, the warning can allow the user to connect the phone to a external power supply and continue the call.

In the case of the warning only mode pre-selection of the non-emergency send call function disablement mode, preferably a pre-selectable override mode is provided to enable the user to override the non-emergency send call function disablement within a pre-selected time period after the disablement. Preferably, the special override key 14D is provided to perform this function. Alternatively, the override function can be obtained by manual selection of the override by actuation of the digits and symbols keys 14A. This override may be important if a call is important to the user but not a pre-approved number or emergency number. For example, the user may wish to take the risk of not having future emergency power to finish a conversation with an important client.

Preferably, a single selection will not result in actuation of the override function. Instead, the initial selection of the override function results in a prompt for confirmation of the override selection being provided to the user. The user confirms the prompt by repeating the steps performed to make the initial selection noted above. If confirmation of the override function is made within a pre-selected time period after the prompt is provided, then non-emergency send call function is again enabled, and the non-emergency call is made without further actuation of the send call function key 14D.

In addition to disabling the emergency call protected mobile telephone 10 from making new non-emergency calls when the precondition for such prevention has occurred, the emergency call capability protector preferably also includes a means for automatically terminating an ongoing non-emergency call. During the course of an ongoing call, the called number remains in temporary storage. Upon detection of the emergency call reserve power level precondition, a comparison is made of the call number to the at least one stored emergency number. If there is not a match, then in step 49, a non-emergency call termination process is initiated. Preferably, as seen in FIG. 2, this termination process includes generation of a pre-termination warning prior to termination of the non-emergency call, preferably an audible warning is provided by energizing the audio speaker circuit 28.

As with the non-emergency call making inhibiting function, the automatic termination of the non-emergency call is subject to being overridden by action taken by the user within a pre-selected time period after commencement of the termination warning. The emergency call capability protector program of FIG. 2 causes the microprocessor 12A to prompt for a confirmation of selection of the non-emergency call termination override function as shown in step 55. Confirmation is preferably by way of repetition of the actions taken to make the preliminary selection of the call termination override function. Confirmation of the non-emergency call override function within another pre-selected time period after the prompt results in actuation of the non-emergency call override function for the remaining course of the ongoing call. In either event of there not being an override initial selection within the time period after the termination warning or there not being a confirmation within the pre-selected time period after the prompt of a final warning, preferably a voice message in step 53 explains the cause of the automatic call termination to both the user and the called party at the called telephone. In the case of a multi-party call, a call can start off as a non-emergency call, and an additional emergency call can be established subsequently and when the battery level depletes below the emergency power reserve level, the emergency call will remain connected while the non-emergency call(s) may be disconnected. Further, this function is not limited to calls. This system can discriminate emergency and non-emergency text messages, Unstructured Supplementary Service Data, or any other information means for which emergency and non-emergency criteria can be discriminated.

Figure 3:
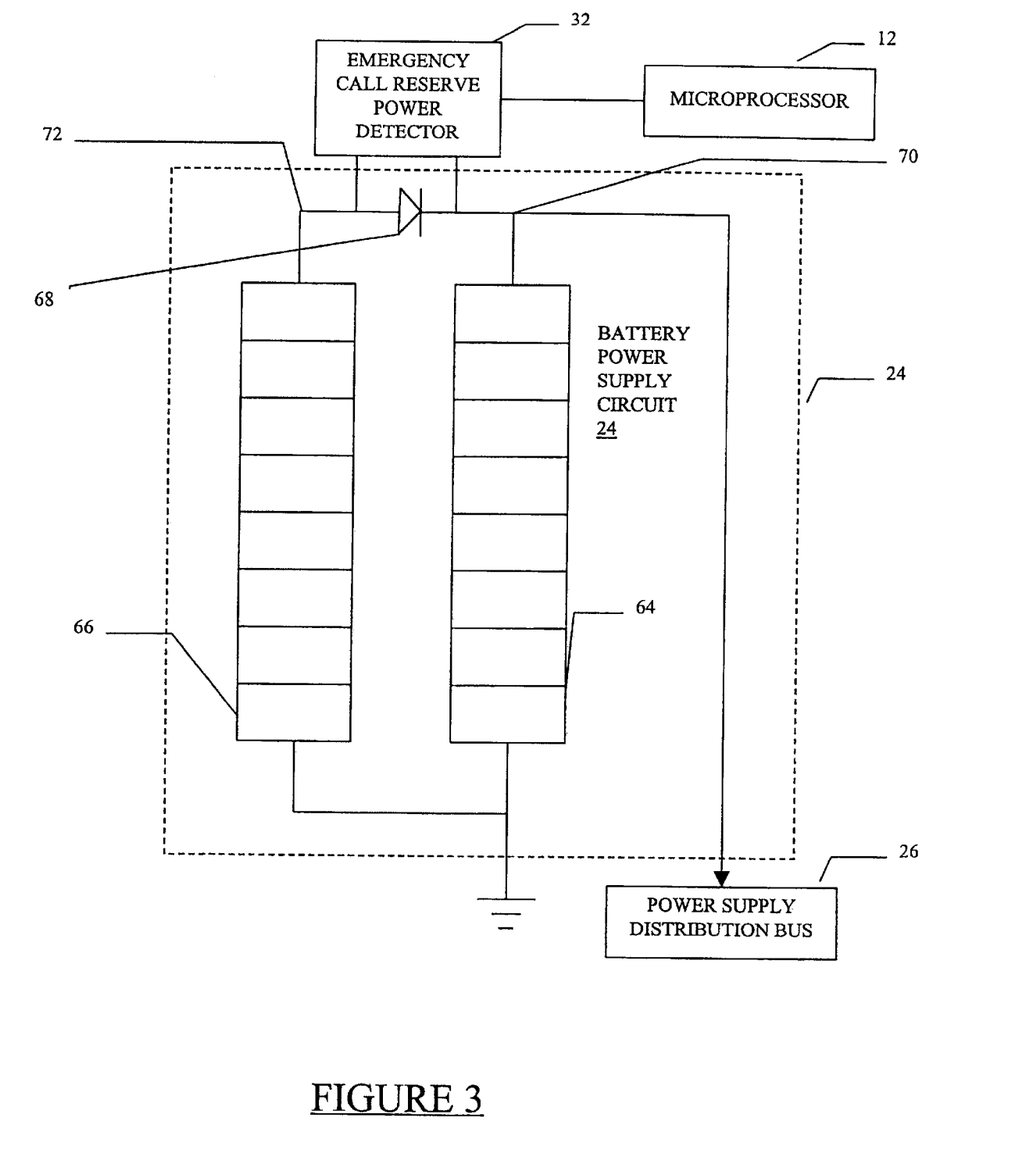
FIG. 3 is a functional block diagram of the preferred embodiment of battery power supply circuit and the emergency call reserve power detector of FIG. 1, in which the battery power supply circuit includes one main battery and one back-up battery, and detection of decrease beneath the emergency call reserve level is indicated when the reserve power is switched into circuit by means of a steering diode.

Referring to FIG. 3, one embodiment of the battery power supply circuit 24 and the emergency call reserve power detector 32 is shown in which the power supply has a primary, or main, battery 64 and a reserve, or back-up battery 66 interconnected in parallel circuit through a diode 68. The emergency call reserve power detector monitors the voltage across the diode 68 to determine when the main battery 64 has been depleted and power is being drawn from the back-up battery 66. Before depletion of the main battery 64, the voltage at a positive terminal 70 connected to the anode of the diode 68 is not less than the voltage produced at a positive terminal 72 of the back-up battery 66 attached to the cathode of the diode 68. Consequently, the diode 68 is not forward biased and no current flows through the diode. Hence, there is no voltage drop across the diode 68 to be detected by the emergency call reserve power detector 32. However, when the main battery 64 becomes depleted, there is a decrease in the voltage across the main battery 64, and the diode 68 becomes forward biased to enable the passage of current through the diode 68, and power begins to be drawn from the back-up battery. This creates a distinctive voltage drop across the forward biased diode 68 that is detected by the emergency call reserve power detector 32 to indicate that the power level is beneath the reserve level.

In accordance with the method of the invention, the steering diode 68 functions as a sensor circuit within the power supply circuit 24 for determining when the main battery 64 has been depleted for purpose of switching the power-using circuits to the back-up battery 66. The emergency call reserve power detector provides a suitable interface circuit between the steering diode 68 and the microprocessor 12A to provide the reserve power output signal in an appropriate form compatible with the microprocessor 12A. As explained above, the microprocessor 12A, in accordance with the emergency call capability protector program of FIG. 2, responds to the emergency reserve power output signal from the interface circuit provided by the emergency call reserve power detector 32 to selectively initiate the non-emergency inhibit mode once the main battery has been depleted.

Figure 4:
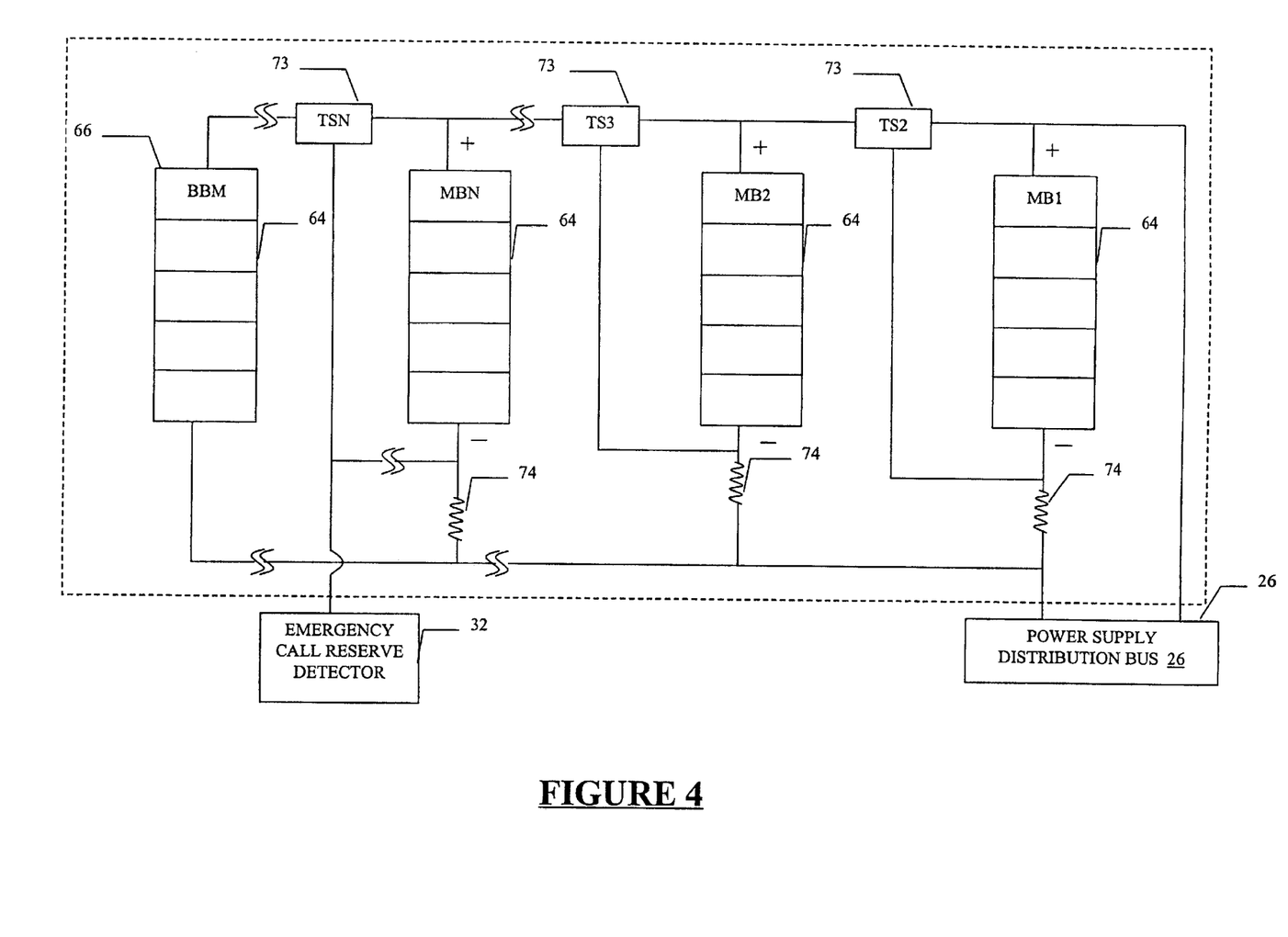
FIG. 4 is a functional block diagram of another suitable embodiment of the emergency call reserve power detector and the battery power supply circuit in which the battery power supply circuit includes a series of main and backup batteries that are successively switched into the power providing circuit as power is drawn from the supply and decrease beneath the reserve power level is detected by detecting when a selected one of the backup batteries is switched into circuit.

Referring to FIG. 4, another battery power supply circuit 26 is shown for use in lieu of the two battery embodiment of FIG. 3 in which there are a plurality of main batteries 64 respectively labeled MB1 through MBN, where "N" is a natural number greater than two. Except for the first main battery MB1 that is connected directly to the power supply distribution bus 26, the main batteries are connected in parallel cascade through a series of respectively associated transistor switches 73 labeled TS2 through TSN that are controlled by a respectively associated plurality of substantially identical current sensing resistors 74. When a battery, connected in series with one of the current sensing resistors 74 becomes depleted, the voltage across the associated current sensing resistor drops beneath a pre-selected level. This voltage decrease causes the associated transistor switch to which it is connected to switch to a conductive state to connect the next successive battery to the power supply distribution bus 26. At least one back-up battery 66 and preferably a plurality of back-up batteries are connected in a parallel cascade substantially similar cascade except for the last back-up battery 66. The last back-up battery, labeled BBM, has no associated current sensing resistor and no transistor switch controlled by a current sensing switch for switching in the next successive backup battery because there is not another back-up battery in the series. The last back-up battery 66 is connected in cascade through the transistor switch 73 controlled by the voltage developed across the current sensing resistor of the previous back-up battery in the cascade of back-up batteries, if there are a plurality of back-up batteries. If there is only one back-up battery 66, then it is connected through a transistor switch TSN controlled by the current through the current sensing resistor of the last main battery of the main battery cascade, main battery MBN as shown. Only the last back-up battery 66 in the series is shown for purposes of simplicity.

The voltage that is developed across the current sensing resistor that is used to control one of the transistor switches 73 that switches into the circuit a selected one of the plurality of back-up batteries is also applied to the inputs of the emergency call reserve power detector 32. When the voltage developed across the current sensing resister 74 decreases to a level to turn on the associated transistor switch 73, the use of reserve power is sensed by the emergency call reserve power detector 32. While the emergency call reserve power detector 32 is shown connected to the last back-up battery 66, alternatively the emergency call reserve power detector 32 can be connected to an intermediate back-up battery 66.

Preferably, the plurality of main batteries 64 are substantially the same and the additional back-up and the other back-up batteries are substantially the same in terms of maximum power storage, although not necessarily the same as the main back-up batteries 66. Depending on the number of batteries provided the user can select what percent the emergency limit should be. For example, if the power supply contains five batteries, the user could select 20%, 40%, 60% or 80%. In this way, the more batteries that are provided, the more exact determination of power level can be determined.

Figure 5A:
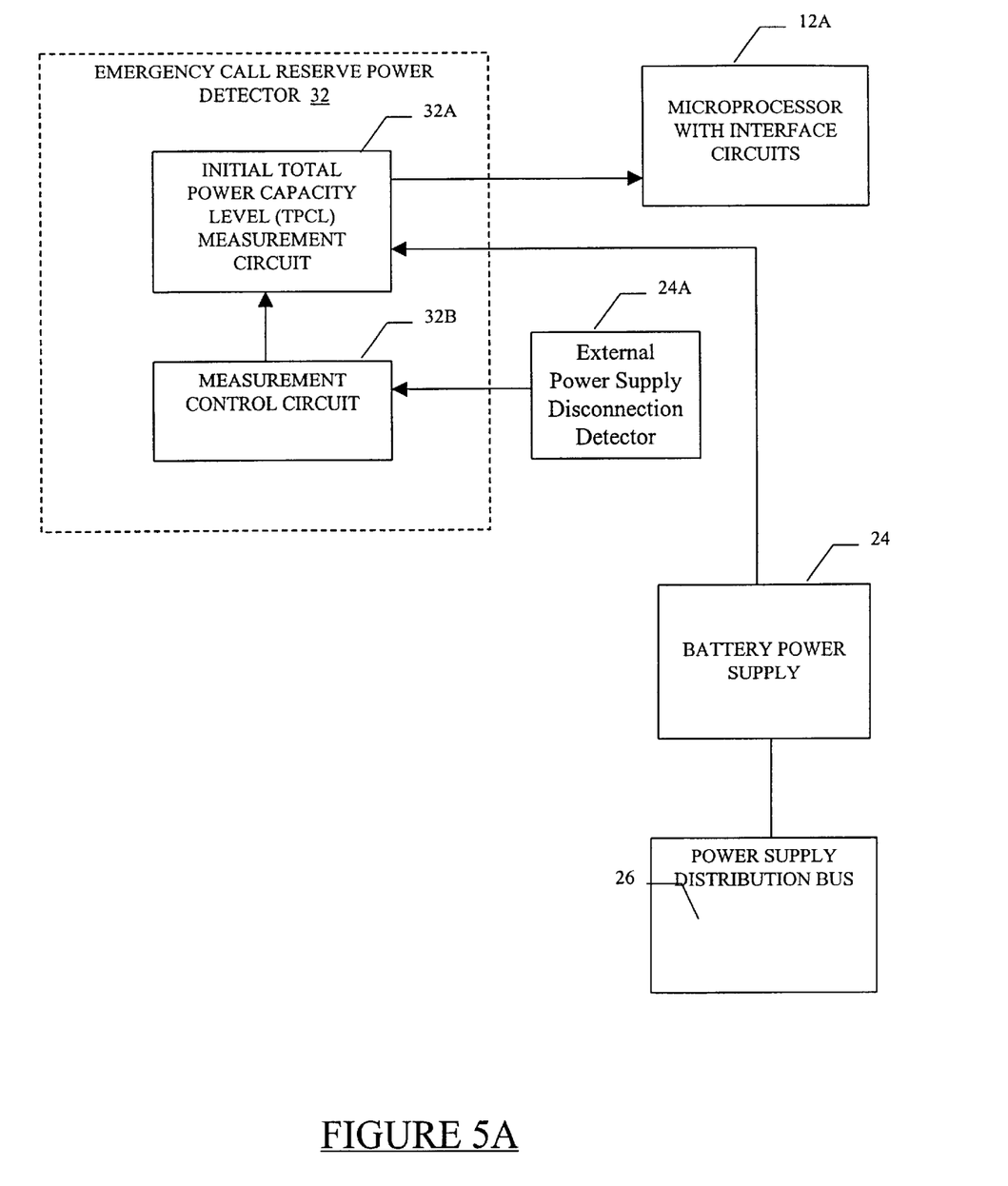
FIG. 5A is a functional block diagram of another form of the emergency call reserve power detector.

Referring now to FIG. 5A, in accordance with another aspect of the invention, the emergency call reserve power detector 32 includes only a power capacity signal generator that provides a signal representative of the fully charged total power capacity level, or the TPCL, of the battery power supply 24 to the microprocessor 12A. The microprocessor 12A in accordance with the subprogram of FIGS. 5B and 5C, automatically calculates the total consumption of power from the battery power supply circuit from the time the battery power supply circuit 24 is first releasably connected to the remainder of the mobile telephone 10, based on the known power consumption of the phone for the different activities. The microprocessor 12A subtracts the total power consumption from the total power capacity level with which it is initially provided by the reserve power detector. Alternatively, the emergency call reserve power detector of FIG. 5A is eliminated, and the total power capacity of the battery power supply circuit 24 is assumed upon disconnection of an external power supply provided to the microprocessor 12A through keystroke entries during initial setup of the emergency call capability protector.

The battery power supply circuit 24 provides DC power to the power supply distribution bus 26 and also provides an input to an initial total power capacity level, or TPCL, measurement circuit 32A of the emergency call reserve power detector 32. The TPCL measurement circuit 32A makes a measurement of the total power capacity level of the battery power supply 24 upon receipt of a measurement control signal from a measurement control circuit 32B. Also connected to the measurement control circuit 32B is an external power supply disconnection detector 24A for providing information on whether an external power supply has been removed from the system. A control signal causing the taking of a power capacity measurement is generated in response to detection of an external power supply being connected or disconnected. After this initial measurement is taken, the TPCL is provided to an input of the microprocessor 12A.

Figure 5B:
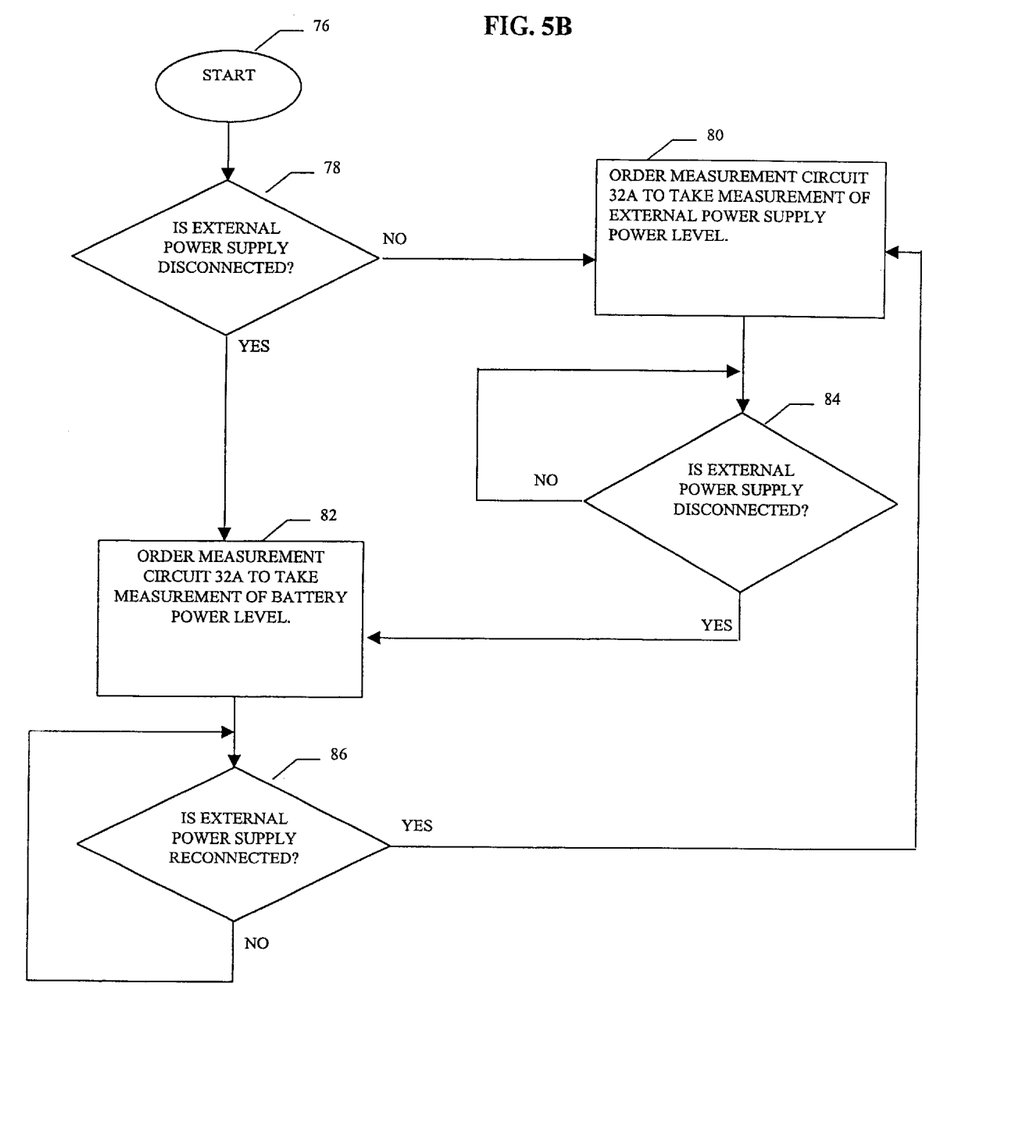
FIG. 5B is a logic flow chart of the measurement control circuit which determines when to measure the remaining power of the power supply.

FIG. 5B illustrates what the measurement control circuit 32B accomplishes. The measurement control circuit 32B determines, based on the input from the external power supply disconnection detector 24A, when to order the measurement circuit 32A to perform a measurement of the power supply.

After the start 76 of the method for computing the power used in association with the battery power supply circuit 24 and the emergency call reserve power detector 32 of FIG. 5A, in step 78 a determination is made as to whether an external power supply is disconnected. If "NO", then in step 80 an order is made to the measurement circuit 32A to take a measurement of external power supply power level. In step 84 a continuous check is made to determine if external power supply is disconnected. If "YES", in step 78 then an order is made in step 82 to measurement circuit 32A to take a measurement of battery power level. This step is also accomplished if during the check in step 84 it is determined that the external power supply has been disconnected. After step 82, a continuous check is made in step 86 to determine if the external power supply becomes reconnected. If the external power supply is reconnected than a return is made to step 80 wherein an order is made to measurement circuit 32A to take a measurement of external power supply level. If "NO" in step 86, then the query is continued.

Figure 5C:
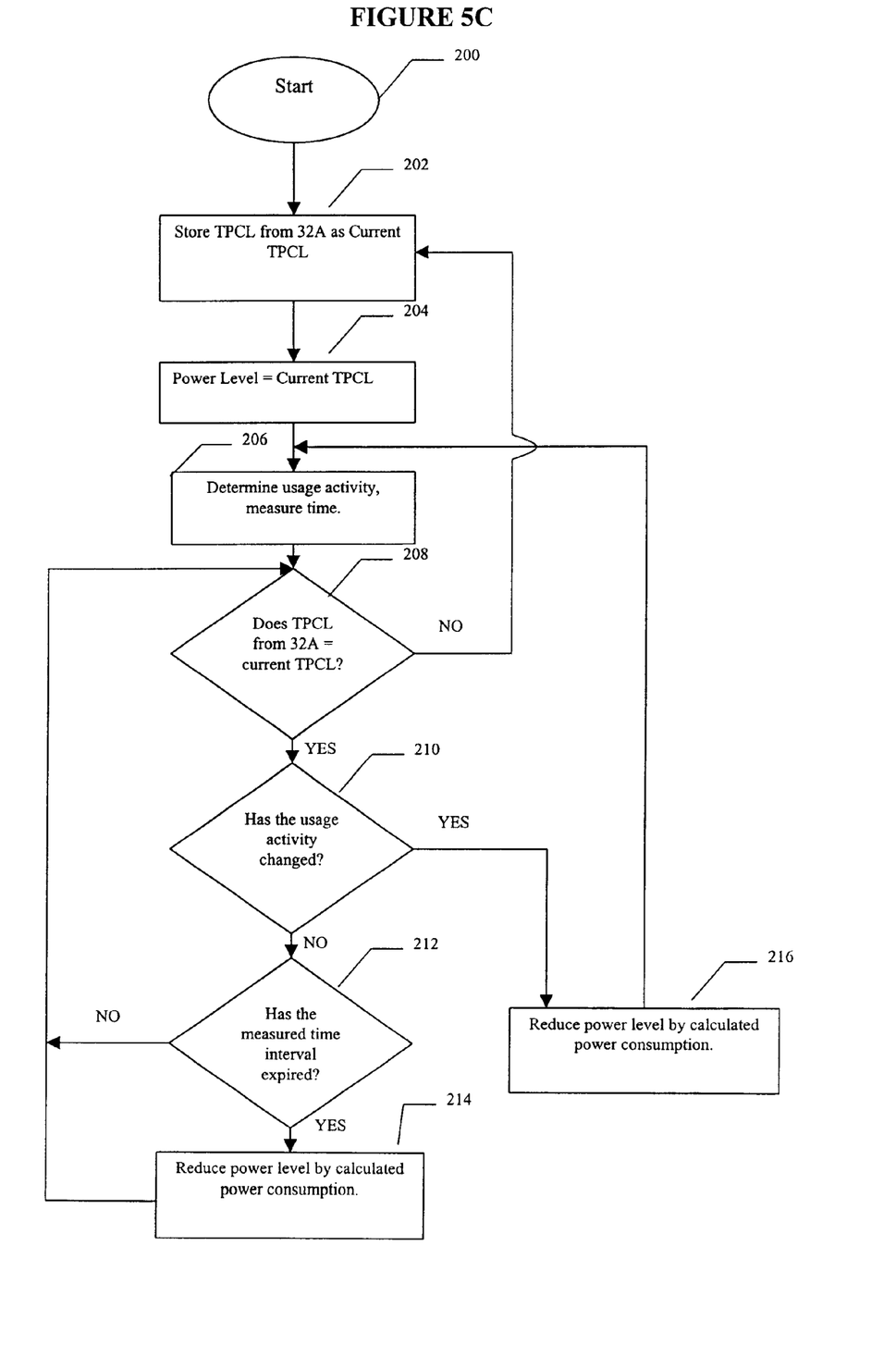
FIG. 5C is a logic flow chart of a subprogram employed by the microcomputer block of FIG. 1 which calculates the amount of remaining power.

FIG. 5C describes the way in which the microprocessor determines and maintains the current power level. After starting in 200, the TPCL from 32A is stored as the current TPCL. The power level is then set to be the current TPCL. In step 206 the usage activity and the time of said activity is measured and in step 208 a determination is made if the TPCL from 32A equals the current TPCL. If no (e.g., the external power supply was disconnected), then return to step 202 and store TPCL as current TPCL. If yes, in step 208 and hence the TPCL from 32A does equal current TPCL then a determination is made in step 210 if the usage activity has changed. If yes, then in step 216 the program reduces the power level by the calculated power consumption and a return to step 206 is accomplished. If no in step 210 then in step 212 a determination is made if the measured time interval has expired. If no in step 212 then a return to step 208 is made. If yes in step 212 then program reduces the power level by calculated power consumption in step 214 and a return to step 208 is made.

Figure 6:
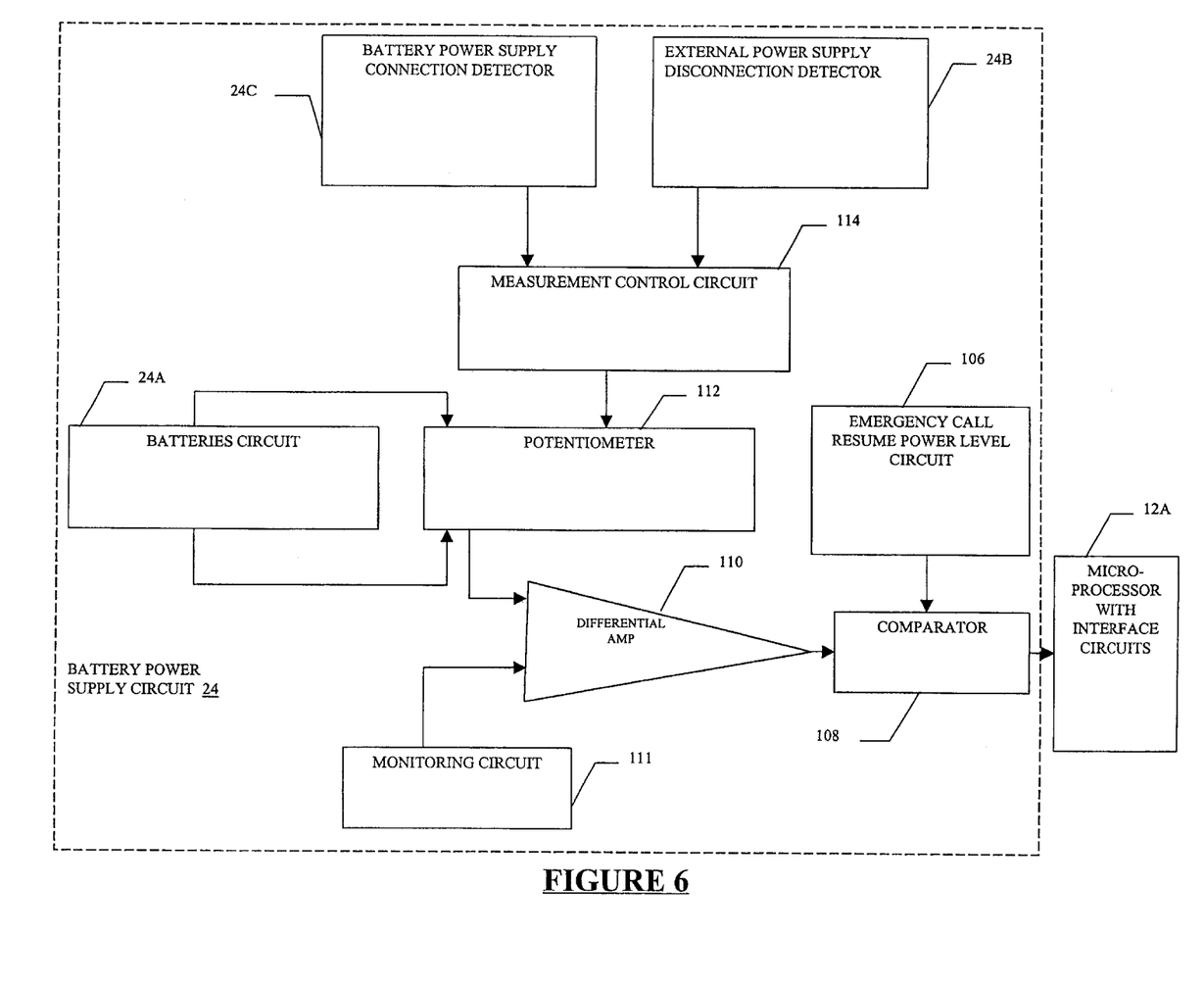
FIG. 6 is a functional block diagram of a further form of the emergency call reserve power detector functional block of FIG. 1 in which the decrease beneath the reserve power level is determined by measuring the voltage across the power supply and comparing it to a pre-selected level to provide the microcomputer with a detection signal.

Turning now to FIG. 6, another embodiment of the battery power supply circuit 24 is shown in which a comparator 108 provides to the microprocessor 12A a signal representative of the difference between the actual power capacity of a batteries circuit 24A and a signal representative of the pre-selected emergency call reserve power level provided by an emergency call reserve power level circuit 106. The signal representative of the actual power that is provided to the comparator 108 is a differential amplifier 110 that generates a signal proportional to the difference between a signal from a monitoring circuit generating a signal representative of the total power capacity measured by the monitor and battery depletion detector 22 and a signal from the tap of a potentiometer 112 that is connected across the batteries circuit 24A. The potentiometer 112 also has an input from measurement control circuit 114 to ensure generation of a signal by the potentiometer 112 that has a sufficient magnitude to prevent inhibiting non-emergency calls whenever the battery power supply is not connected or whenever the external power supply is connected.

Still referring to FIG. 6, in accordance with the method of the invention, in this embodiment of the emergency call reserve power detector 32, used with a battery power supply circuit 24 employing only a single battery, the reserve power detector 32 includes a monitoring circuit for monitoring the total consumption of power from the single battery in order to determine the power level remaining. A detector circuit responds to the determination by the monitoring circuit of the total consumption of power to detect when the remaining power has decreased beneath the emergency call reserve level. The detector circuit employs a differential amplifier for subtracting the total consumption of power as indicated by the monitoring circuit 111 from the maximum power containable by the main battery power supply as represented by the output of the potentiometer 112 in order to detect decrease of the single battery beneath the emergency call reserve level. The potentiometer 112 thus stores a representation of the power of the main battery power supply after being fully charged, and the differential amplifier functions to subtract the total consumption of power from said representation of full power. The power remaining is represented by the magnitude of the resultant output signal of the differential amplifier. This remaining power level signal is compared to a stored representation of the emergency call reserve power level by a comparator 108 to determine when the single battery has decreased beneath the emergency call reserve power level.

When the decrease beneath the emergency call reserve power level is detected, the comparator 108 provides a signal to the microprocessor 12A indicating this event to place it in the inhibit mode. Preferably, the monitoring means circuit 111 is contained within a common battery supply housing and together with the single battery 24A form a composite battery pack with a built-in reserve power level indicator output.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. A reserve power system for any battery operated mobile telephone, comprising:

a means for specifying a reserve power level that is greater than an absolute minimum limit power level for making an outgoing emergency call connection;

a register for storing a particular user defined emergency number;

a means for detecting when the power level of said reserve power system decreases beneath said specified power level; and means responsive to the detecting means for inhibiting the operation of said mobile telephone for normal operation, but allowing for the operation of said mobile telephone for making an outgoing call connection request towards said emergency number.

2. The reserve power system for any battery operated device of claim 1, further comprising a means for detecting the connection of an external power supply and a means responsive to said means for detecting said external power supply for returning said battery operated device to normal operation.

3. The reserve power system of claim 1, further comprising a means responsive to the detecting means for terminating any ongoing non-emergency call.

4. The reserve power system of claim 1, further comprising a means responsive to said detecting means for generating a pre-termination warning.

5. The reserve power system of claim 1, further comprising a means for selectively overriding said inhibiting means.

6. The reserve power system of claim 5, wherein said selectively overriding means comprises:

a means for preliminarily selecting an override function;

a means responsive to said preliminarily selecting said override function to provide a prompt for confirmation of said override function selection;

a means for confirming said override function selection; and a means responsive to said confirming said override function selection to actuate said override function to override said inhibiting means.

7. The reserve power system of claim 1, further comprising a means for providing a warning only without termination when said battery power level decreases beneath said specified reserve power level during an ongoing non-emergency call.

8. The reserve power system of claim 1, wherein said battery power supply includes:

a main battery power supply having at least one main battery;

an emergency back-up power supply having at least one back-up battery;

a means for controlling use of said battery power supply to switch at least some power using circuits of the reserve power system to draw power from said emergency back-up battery supply after said main battery power supply has been depleted beneath a preselected depletion level; and a power level detecting means responsive to the power controlling means for sensing when said circuits have been switched to the back-up battery supply for actuating the non-emergency call inhibiting means.

9. The reserve power system of claim 8, further comprising:

a microcomputer for controlling substantially all reserve power system activities;

a sensing means which comprises a steering diode circuit for determining when said main battery has been depleted for purpose of switching all power consuming circuits to the back-up battery;

an interface circuit between said steering diode circuit and said microprocessor; and a sensing subprogram stored within said microcomputer to actuate said inhibiting means in response to a determination that the main battery has been depleted.

10. The reserve power system of claim 1, wherein said detecting means includes a means for monitoring the total consumption of power from said battery power supply in order to detect when said power level remaining decreases beneath said emergency call reserve level.

11. The reserve power system of claim 10, wherein said detecting means includes a means responsive to said monitoring means for subtracting the total consumption of power from said main battery power supply from a maximum power storage capacity by said main battery power supply in order to detect a decrease of the main power supply beneath the emergency call reserve level.

12. The reserve power system of claim 1, further comprising:

a means for making an emergency call automatically in response to actuation of a special emergency call function, and wherein said detecting means further comprises a means for sensing actuation of the emergency call function to provide an emergency call indication to the detecting means.

13. A mobile telephone with a reserve power system, comprising:

a battery power supply;

a processor for making outgoing call connections and receiving incoming call connections;

a register for storing a value indicative of threshold power level associated with said battery power supply for making an emergency outgoing call connection for a particular period of time;

a second register for storing a particular user-defined emergency number;

a determiner for determining whether said battery power supply is below said threshold power level; and wherein said processor prohibiting all incoming and outgoing call connections other than making an emergency outgoing call connection towards said user defined emergency number stored within said second register in response to said determination by said determiner.

14. The mobile telephone of claim 13, wherein said processor further disconnects any ongoing non-emergency call connection in response to said determination.

15. The mobile telephone of claim 13, further comprising a means for selectively overriding said processor from prohibiting said all incoming and outgoing call connections.

16. A method for protecting emergency call capability for emergency use of a mobile telephone having a battery power supply with a total power level that declines during operation, comprising the steps of:

specifying a minimum threshold value for said battery power supply;

storing a user defined emergency number;

receiving a request to originate an outgoing call connection towards a particular number;

originating said outgoing call connection while said power level is above said specified threshold value;

determining that said power level has decreased beneath said specified threshold value; and determining whether said particular number associated with said outgoing call connection request matches said stored user defined emergency number;

in response to said determination that said particular number matches said stored user defined emergency number, originating said outgoing call connection;

otherwise;

denying said outgoing call connection request.

* * * * *